UNITED STATES PATENT OFFICE.

EDWIN L. SIMPSON, OF BRIDGEPORT, CONNECTICUT, ASSIGNOR TO SIMON STEVENS, OF NEW YORK, N. Y.

IMPROVEMENT IN THE PREPARATION OF INDIA-RUBBER FOR THE MANUFACTURE OF HOSE, BELTING, PACKING, &c.

Specification forming part of Letters Patent No. 46,608, dated February 28, 1865.

*To all whom it may concern:*

Be it known that I, EDWIN L. SIMPSON, of Bridgeport, in the county of Fairfield and State of Connecticut, have invented a new and useful Improvement in Preparing India-Rubber for Mechanical Purposes; and I do hereby declare the following to be a full, clear, and exact description of the same.

My invention relates to an improvement in the preparation of india-rubber for the manufacture of hose, belting, packing, &c., commonly called "steam-gum," from the fact that it is cured by the application of hot steam instead of dry heat; and my invention consists in the employment of my improved compound, for which I have applied for Letters Patent, in such proportion to the quantity of india-rubber or other similar gum used that after being subjected to the required heat the rubber will have attained those properties required in hose, steam, or other packing, belting, and mechanical purposes generally.

To enable others skilled in the art to prepare my compound and manufacture articles therefrom, I will proceed to fully describe the same. I will first describe the improved compound as set forth in the specification accompanying my application for Letters Patent before referred to.

To facilitate the preparation of the compound, I first boil linseed or other similar vegetable oil to about the consistency of honey; then to each quart of oil so boiled add about one pound of sulphur, subjecting this to a moderate heat, sufficient only to pass from a semifluid state to an elastic spongy or doughy substance. This forms my improved compound, in the preparation of which the odor or apparent presence of sulphur is removed, and when combined with india-rubber or other similar gum or gums and subjected to a sufficient regulated heat will cause the same to undergo a change and produce a manufacture entirely free from the disagreeable odor and other deleterious effects of the sulphur in common vulcanized rubber.

To prepare india-rubber or other similar gum or gums for mechanical purposes, to one pound of india-rubber add two to four ounces of my improved compound, about five to six ounces litharge or white lead; add some zinc or other coloring-matter; grind the several ingredients together between warm rolls till thoroughly mixed; then roll into sheets or apply it to cloth in the usual manner, according to the purpose for which it is to be used; then place it in a chamber to which steam is admitted, and raise the temperature to 270° Fahrenheit, so to remain for about four or five hours. If a higher degree of heat is maintained, less time will be required. Thus prepared, the india-rubber is applicable for all purposes for which vulcanized rubber is now used mechanically, and many others, owing to the absence of the odor of sulphur and other deleterious effects always present in vulcanized rubber.

Having therefore fully described my invention, what I claim as new and useful, and desire to secure by Letters Patent, is—

Preparing india-rubber and other similar gums for mechanical purposes in the manner substantially as herein set forth.

, EDWIN L. SIMPSON.

Witnesses:
  H. M. WELCH,
  JOHN E. EARLE.